United States Patent
Hamels

(10) Patent No.: US 8,002,308 B2
(45) Date of Patent: Aug. 23, 2011

(54) GAS BAG MODULE FOR A VEHICLE OCCUPANT RESTRAINT SYSTEM AND METHOD FOR PRODUCING A GAS BAG MODULE

(75) Inventor: Stefan Hamels, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/805,449

(22) Filed: Jul. 30, 2010

(65) Prior Publication Data

US 2010/0295278 A1   Nov. 25, 2010

Related U.S. Application Data

(63) Continuation of application No. PCT/EP2009/057776, filed on Jun. 23, 2009.

(30) Foreign Application Priority Data

Jun. 26, 2008 (DE) .......................... 10 2008 030 184

(51) Int. Cl.
*B60R 21/201* (2011.01)

(52) U.S. Cl. ................................. 280/728.2; 280/728.1

(58) Field of Classification Search ................ 280/728.2, 280/728.1; 53/432
See application file for complete search history.

(56) References Cited

U.S. PATENT DOCUMENTS

| | | | | |
|---|---|---|---|---|
| 5,000,321 A | * | 3/1991 | Heilmann et al. | 229/216 |
| 5,096,222 A | * | 3/1992 | Komerska et al. | 280/732 |
| 6,177,366 B1 | | 1/2001 | Li | |
| 7,549,271 B2 | * | 6/2009 | Miwa et al. | 53/436 |
| 2002/0135160 A1 | * | 9/2002 | Lorenz | 280/728.1 |
| 2007/0138768 A1 | * | 6/2007 | Miwa et al. | 280/728.2 |
| 2007/0138769 A1 | * | 6/2007 | Miwa et al. | 280/728.2 |
| 2007/0145724 A1 | | 6/2007 | Miwa et al. | |
| 2007/0241541 A1 | * | 10/2007 | Miwa et al. | 280/728.2 |
| 2008/0111351 A1 | * | 5/2008 | Eckert et al. | 280/728.2 |
| 2008/0247686 A1 | * | 10/2008 | Phee et al. | 383/207 |
| 2008/0290639 A1 | | 11/2008 | Basten et al. | |
| 2009/0072522 A1 | | 3/2009 | Eckert et al. | |
| 2009/0266720 A1 | * | 10/2009 | Richards | 206/213.1 |

FOREIGN PATENT DOCUMENTS

| | | |
|---|---|---|
| DE | 20 20060 05 319 U1 | 6/2006 |
| DE | 10 2006 054 392 A1 | 11/2006 |
| DE | 20 2007 007 245 U1 | 8/2007 |
| DE | 697 37 462 T2 | 12/2007 |
| EP | 1 803 613 | 7/2007 |
| EP | 1 923 277 A1 | 10/2007 |
| WO | WO-98/34785 | 8/1998 |

OTHER PUBLICATIONS

Notification of Transmittal of IPRP in PCT/EP2009/057776 dated Jan. 27, 2011.

* cited by examiner

*Primary Examiner* — Paul N Dickson
*Assistant Examiner* — Drew Brown
(74) *Attorney, Agent, or Firm* — Foley & Lardner LLP

(57) ABSTRACT

An gas bag module for a vehicle occupant restraint system is provided. The gas bag module comprising an inflatable gas bag, an envelope inside of which the gas bag is vacuum packed and which comprises a first and a second material. The first material has a lower gas permeability than the second material and the second material has a higher tear strength than the first material.

16 Claims, 1 Drawing Sheet

GAS BAG MODULE FOR A VEHICLE OCCUPANT RESTRAINT SYSTEM AND METHOD FOR PRODUCING A GAS BAG MODULE

CROSS-REFERENCE TO RELATED PATENT APPLICATIONS

This application is a Continuation of International Application PCT/EP2009/057776, filed Jun. 23, 2009, which was published in German on Dec. 30, 2009 at WO 2009/156381 A1. The foregoing International Application is incorporated herein by reference in its entirety.

BACKGROUND

The invention relates to a gas bag module for a vehicle occupant restrain system and a method for producing a gas bag module. The gas bag according to the invention comprises a gas bag which is vacuum-packed in an envelope.

The vacuum-packing of a gas bag of a vehicle occupant restraint system is known for instance from DE 20 2006 005 319 U1.

SUMMARY

The object to be solved by the present invention is to counteract a detachment of parts of the vacuum envelope of the gas bag during unfolding of the gas bag.

According to an exemplary embodiment of the invention, a gas bag module is provided with
  an inflatable gas bag;
  an envelope inside of which the gas bag is vacuum-packed and which comprises a first and a second material, wherein
  the first material has a lower gas permeability than the second material and the second material has a higher tear strength than the first material.

The envelope (package) of the gas bag is therefore on the one hand formed by the first material sufficiently gas-tight so that the vacuum is maintained in the envelope for a sufficient time range. On the other hand, the envelope is sufficiently tear-proof due to the second material in order to counteract and if possible to avoid a detachment (separation) of parts of the envelope during unfolding of the gas bag.

In an exemplary embodiment of the invention the envelope is designed in form of a film whereby the first material forms a first layer and the second material forms a second layer of at least one section of the film. The first and the second material are therefore each designed in form of a film, whereby the first layer has the sealing function and the second layer ensures the tear strength of the envelope. It is to be mentioned that the envelope can be designed exclusively by the first and the second layer. This is however not necessarily required so that the envelope can also have further material layers beside the first and the second layer.

The first material is in particular connected to the second material. The connecting of the first and the second material occurs for instance by lining and/or laminating. In the case that the first and the second material are each designed in form of a film, the two films can be in particular arranged parallel to each other and connected to each other. The two films can also directly adjoin each other or can for instance also be connected to each other via a further material layer.

In order to achieve a preferably controlled tearing of the envelope during unfolding of the gas bag the second material, in particular if it is designed in form of a film, can have a tear-open region which tears open under the pressure of the unfolding gas bag. The tear-open region can be for instance designed as a pre-weakening material in the second material and/or in form of a perforation in the second material. Additionally, also the first material can have a tear-open region.

The first, gas-tight material forms for instance an inner, e.g. adjoining to the folded gas bag, layer of the envelope while the second, more tear-proof material forms an outer layer of the envelope. However, the second material can vice versa have an inner layer, also if only this has a tear-open region, and the first material can form an outer layer of the envelope.

In a further exemplary embodiment of the invention the envelope designed as a film has a base and a top film, wherein the base film forms a receptacle in which the gas bag is housed. The top film closes the receptacle formed by the base film. Base and top film are thereby connected to each other for instance by gluing or welding.

In an exemplary variant of the invention the film-like envelope is designed such that only the top film has a first and a second layer. The top film is for instance formed in multi-layers from at least one first, gas-tight and a second, tear-proof film, while the base film has only a single, gas-tight film. In another variant the top as well as the base film are formed multi-layered, for instance bi-layered, with a gas-tight and a tear-proven film, respectively.

The top film can comprise a further layer beside the first and the second layer which can be welded to the base film better than the first layer. In this variant the top film has therefore beside the gas-tight first layer and the tear-proven second layer a further, good weldable layer which does not necessarily have to have the gas barrier properties as the first film. The top film can however also has a first layer which is gas-tight as well as weldable to the base film in a good manner.

In case the second material is formed in form of a film, the thickness of the film influences the tear strength. In an example the film (e.g. the second layer of the film-like envelope) is formed with a thickness of at least 0.1 mm.

Polyethylene-spun-bonded fabric, HD-polyethylene (high density polyethylene), polycarbonate and/or polyamide are considered as second material (also in form of a film). The second material has in particular a tear strength of at least 70 N/mm2. Of course the second material can be used which has a lower tear strength as long as this is sufficient to counteract a separation of the second material during inflation of the gas bag.

A second material can be selected, in particular which has a high tear resistance, so that during unfolding of the gas bag a controlled tearing of the second material in a tear open region (for instance as mentioned above in form of a perforation in the second material) is possible without that the second material tears open further than the tear-open region so that parts of the second material are detached and accelerated by the unfolding gas bag.

Thermoplastic synthetics, for instance PET (Polyethylenterephthalat) or PE (Polyethylene), are considered as first material. When forming the first material as a film it has for instance a thickness between 0.05 and 0.15 mm. Of course, also other materials with a sufficient gas tightness can be used, for instance with the gas tightness which corresponds to the gas tightness of a PE film with a thickness between 0.05 and 0.15 mm.

The method according to an exemplary embodiment of the invention comprises the following steps:
  providing and folding a gas bag
  vacuum packing of the folded gas bag in an envelope which has a first and a second material, wherein the first material has a lower gas permeability than the second material and the second material has a higher tear strength than the first material.

The invention is explained in more detail in the following based on the example referring to the Figures.

DETAILED DESCRIPTION

Figure 1:
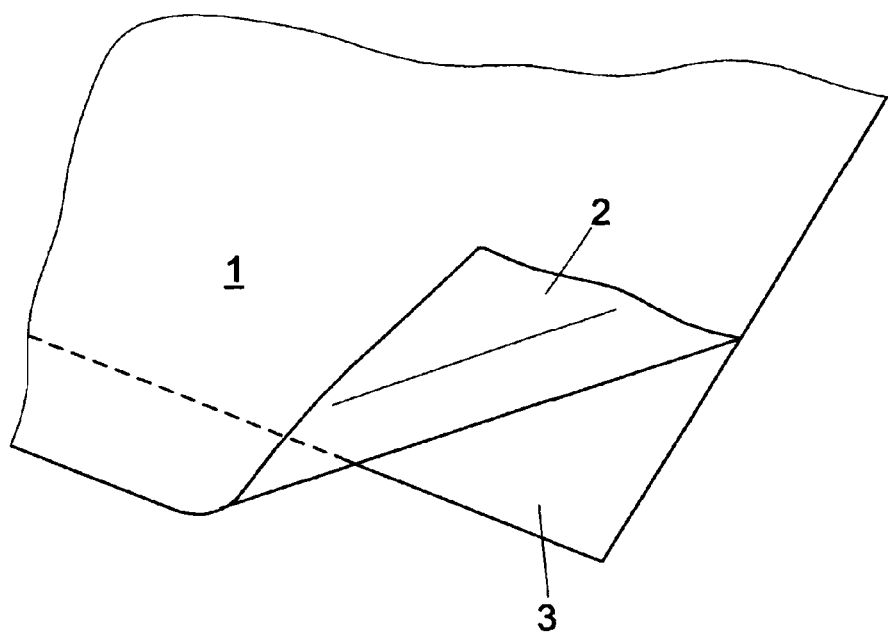
FIG. 1 shows an envelope of a gas bag according to a first embodiment of the invention.

FIG. 1 shows a film-like envelope 1 for vacuum packing a gas bag (not shown) which has a first material in form of a first film 2. The first film 2 is connected to a second material in form of a second film 3 wherein the first and the second film 2, 3 lie adjacent to one another in a planar fashion. In FIG. 1 the first film 2 is turned off in a corner region from the second film 3 solely for illustration.

The second film 3 is formed of a material which has a higher tear strength compared to the material of the first film 2, for instance which can be formed of a highly tear-proof material. The tear strength of the second film 3 is sufficient to counteract a detachment of sub-sections of the second film during unfolding of the gas bag packed in the envelope. Furthermore, the high tear strength of the second film 3 can also counteract a detachment of other areas of the envelope 1, in particular of the first film 2, during unfolding of the gas bag.

The first film 2 is therefore stabilized by the second film 3 and does not therefore have especially high tear strength. However, the first film 2 has a lower gas permeability, for instance for gas which is used for inflating the gas bag than the second film 3. Therefore, the second film 3 is responsible for the high tear strength of the envelope 1, but does not have to be in particular gas-impermeable since this property of the envelope is provided by the first film 2.

The first and the second film 2, 3 can be connected to each other lying flat against each other by lining or laminating so that a tight composite is formed.

Figure 2:
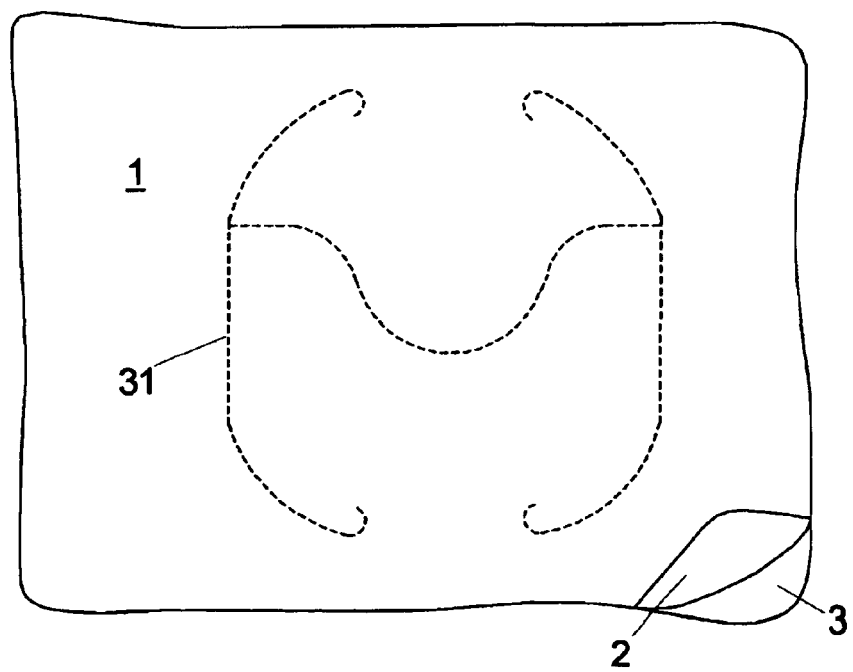
FIG. 2 shows an envelope of the gas bag according to a second embodiment of the invention.

FIG. 2 shows a section of a gas bag envelope 1 which is formed like a film as in the example of FIG. 1 and which has in analogy to FIG. 1 a first material in form of a first film 2 and a second material in form of a second film 3.

In the second, more tear-proof film 3 a tear-open region is formed in way of a perforation 31. The perforation 31 is such that it can be torn open by the unfolding gas bag such that an opening is formed in the second film 3 through which the gas bag can unfold. The material of the second film has a high tear strength so that the second film essentially tears open only along the perforation 31 and not beyond it.

The priority application, German Patent Application DE 10 2008 030 184.1, filed Jun. 26, 2008 including the specification, drawings, claims and abstract, is incorporated herein by reference in its entirety.

What is claimed is:

1. A gas bag module for a vehicle occupant restraint system comprising
an inflatable gas bag;
an envelope inside of which the gas bag is vacuum packed and which comprises a first and a second material, wherein
the first material has a lower gas permeability than the second material and the second material has a higher tear strength than the first material.

2. The gas bag module according to claim 1, wherein the envelope is designed as a film, whereas the first material forms a first layer and the second material forms a second layer of at least a section of the film.

3. The gas bag module according to claim 1, wherein the second material has a tear-open region, which enables the second material being torn open under the pressure of the unfolding gas bag.

4. The gas bag module according to claim 3, wherein the tear-open region is designed in form of a pre-weakening material and/or in form of a perforation in the second material.

5. The gas bag module according to claim 2, wherein the first layer is designed in form of a first film and the second layer is designed in form of a second film.

6. The gas bag module according to claim 2, wherein the envelope comprises
a base film forming a receptacle into which the gas bag is mounted; as well as
a top film which encloses the receptacle formed by the base film.

7. The gas bag module according to claim 6, wherein only the top film comprises the first and the second layer.

8. The gas bag module according to claim 6, wherein the base film as well as the top film comprise the first and the second layer, respectively.

9. The gas bag module according to claim 7, wherein the top film has a further layer, which is welded to the base film better than the first layer.

10. The gas bag module according to claim 8, wherein the top film has a further layer, which is welded to the base film better than the first layer.

11. The gas bag module according to claim 2, wherein the second layer has a thickness of at least 0.1 mm.

12. The gas bag module according to claim 1, wherein the first material is connected to the second material.

13. The gas bag module according to claim 12, wherein the first and the second material are connected to each other by lining and/or laminating.

14. The gas bag module according preceding claim 1, wherein the second material comprises polyethylene spun-bonded fabric, HD-polyethylene, polycarbonate and/or polyamide.

15. The gas bag module according to claim 1, wherein the second material has a tear strength of at least 70 N/mm2.

16. A method for producing a gas bag module, in particular according to claim 1, with the following steps:
providing and folding a gas bag;
vacuum packing of the folded gas bag in an envelope, which has a first and a second material, whereat
the first material has a lower gas permeability than the second material and the second material has a higher tear strength than the first material.

* * * * *